May 28, 1935.  W. F. SCHULZ  2,002,987
REENFORCEMENT FOR TUBULAR AND LIKE STRUCTURES
Filed April 29, 1932  6 Sheets-Sheet 1
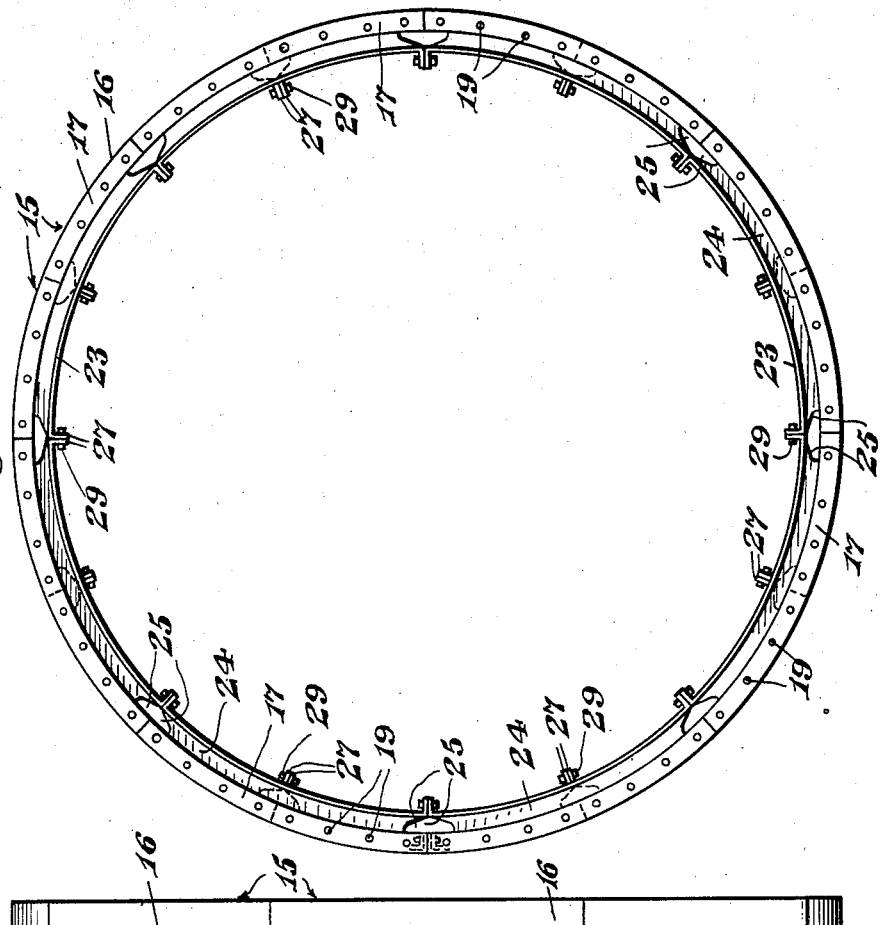
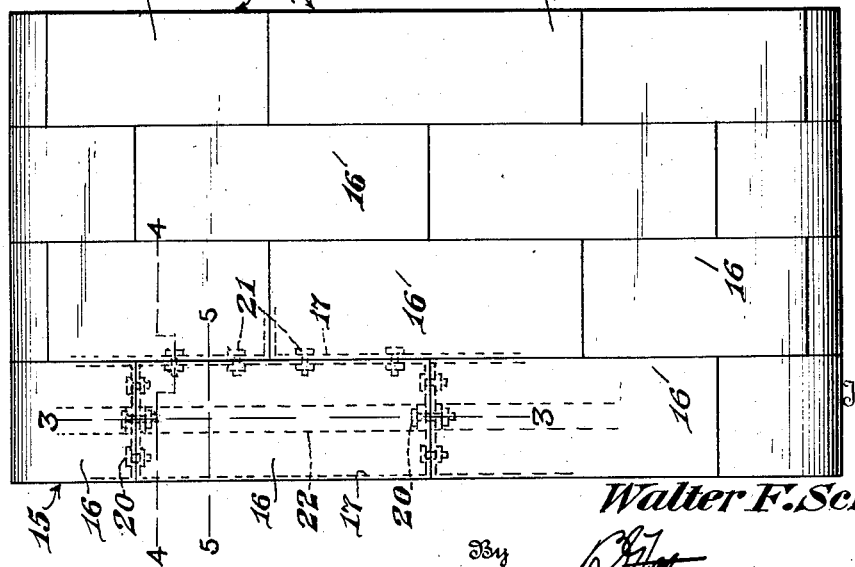
Inventor
Walter F. Schulz,
By
Attorney May 28, 1935.  W. F. SCHULZ  2,002,987
REENFORCEMENT FOR TUBULAR AND LIKE STRUCTURES
Filed April 29, 1932  6 Sheets-Sheet 2
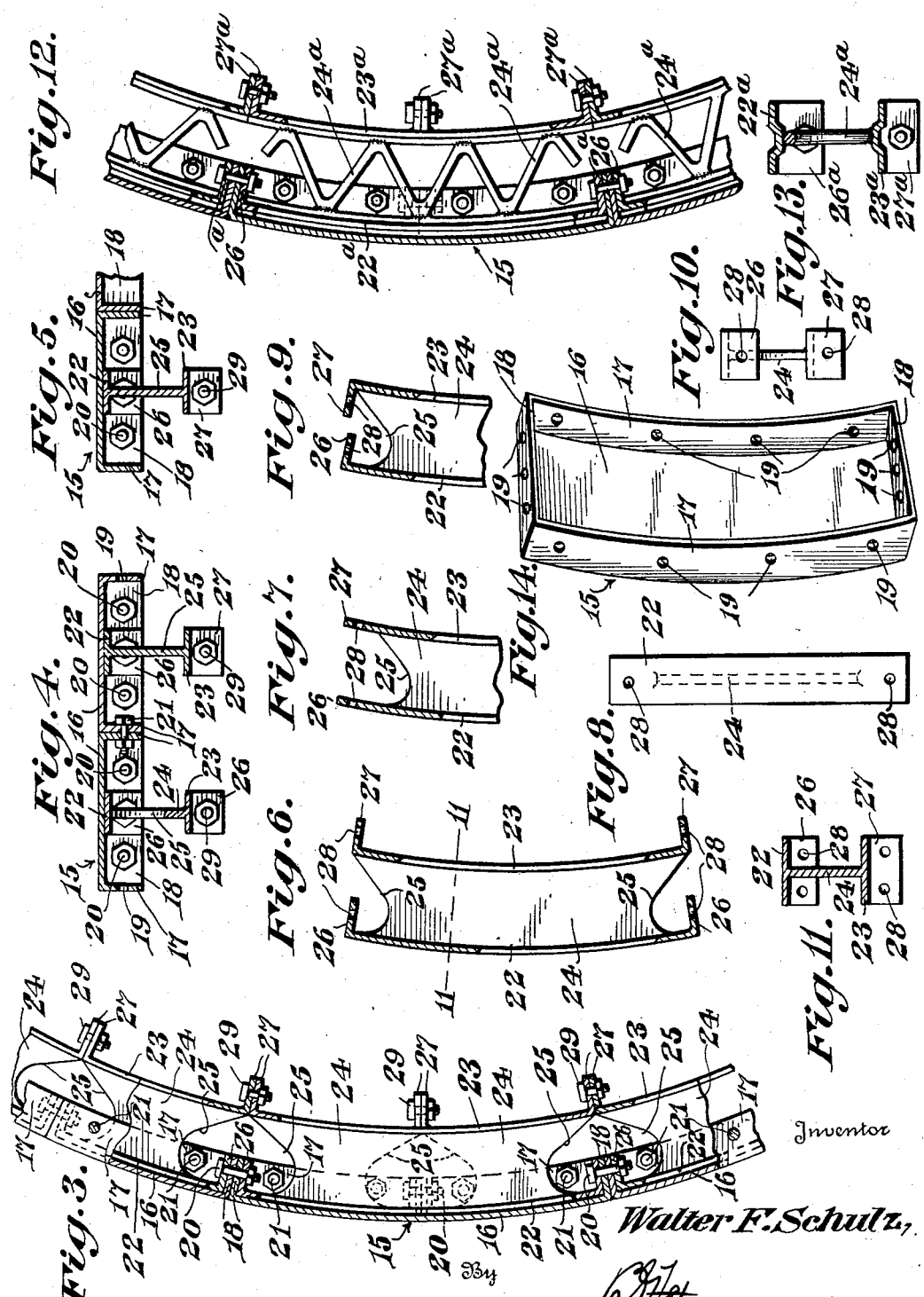
Inventor
Walter F. Schulz,
By
Attorney

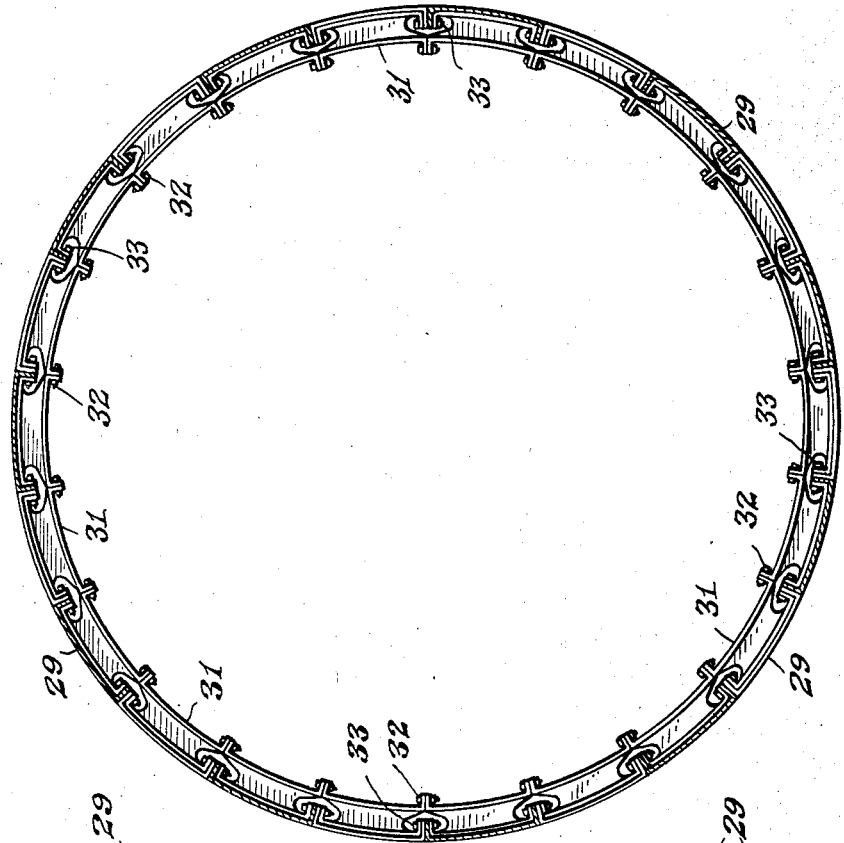
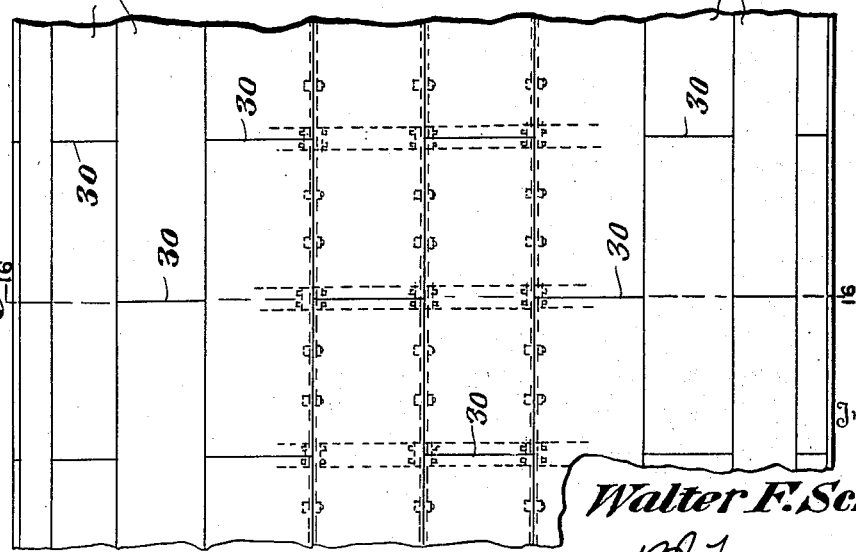

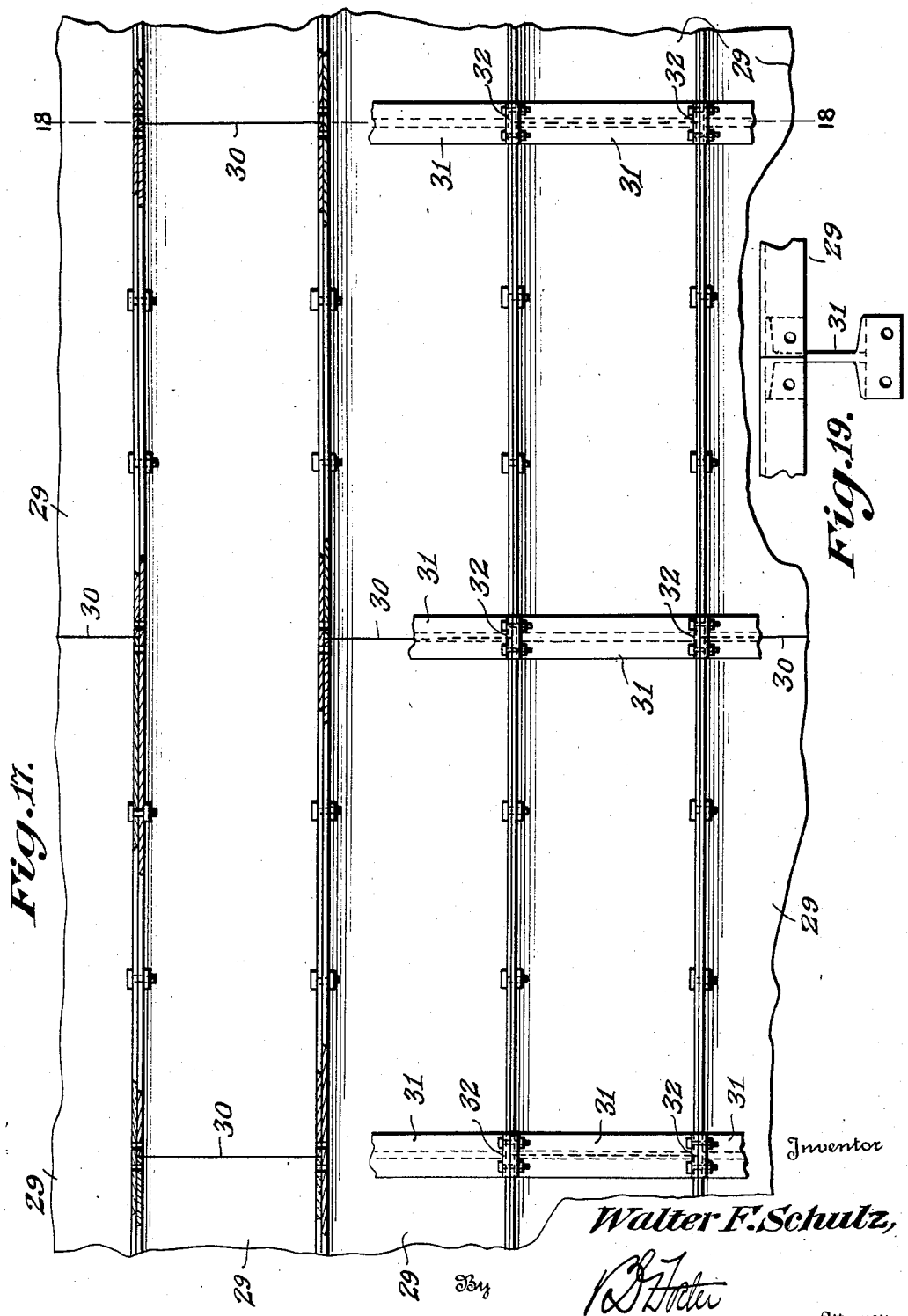

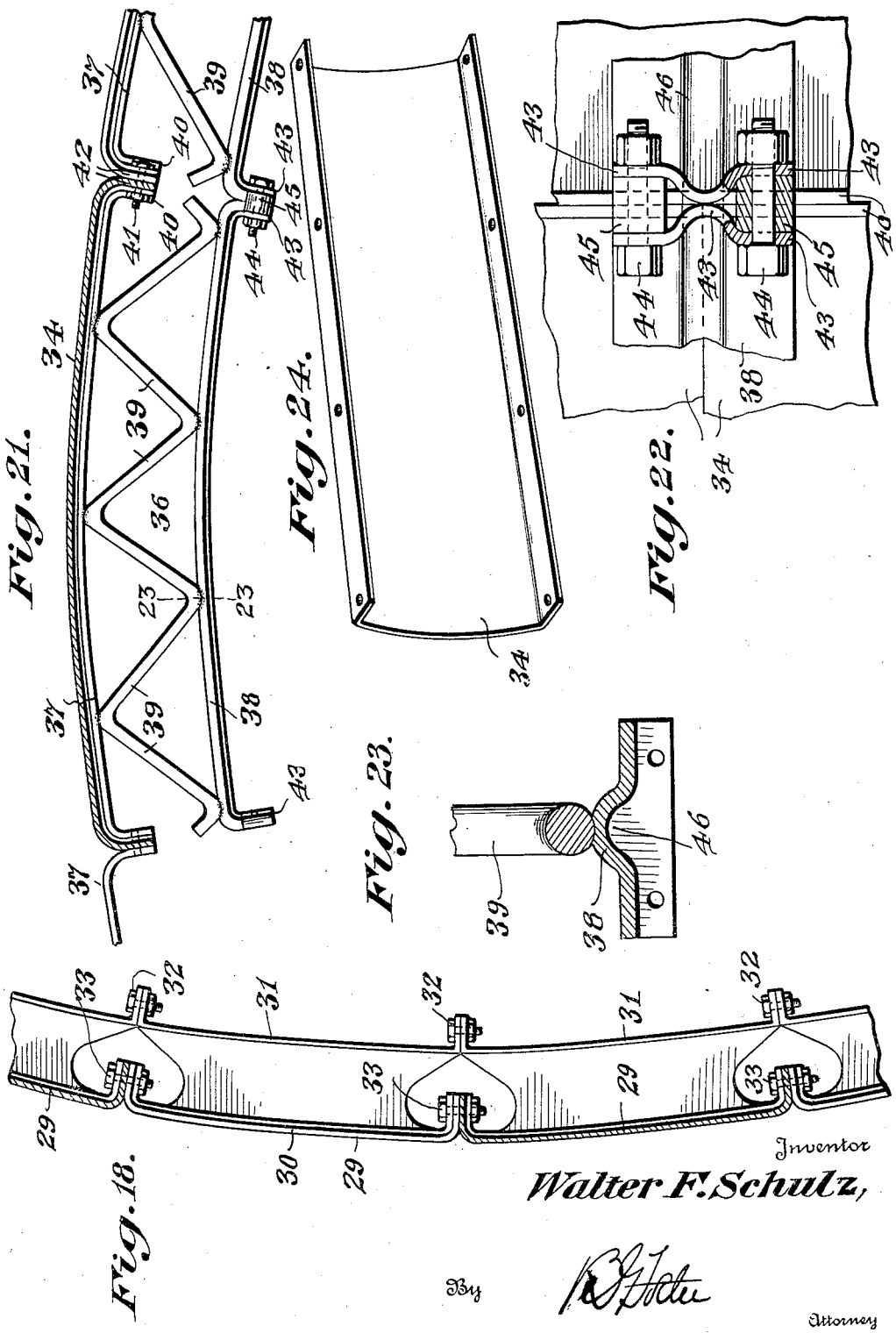

May 28, 1935. W. F. SCHULZ 2,002,987
REENFORCEMENT FOR TUBULAR AND LIKE STRUCTURES
Filed April 29, 1932 6 Sheets-Sheet 6

Walter F. Schulz, Inventor

Patented May 28, 1935

2,002,987

UNITED STATES PATENT OFFICE 2,002,987

REENFORCEMENT FOR TUBULAR AND LIKE STRUCTURES

Walter F. Schulz, Youngstown, Ohio, assignor to Truscon Steel Company, Youngstown, Ohio, a corporation of Michigan Application April 29, 1932, Serial No. 608,323

19 Claims. (Cl. 61—45)

The present invention relates more specifically to means for reenforcing structures built up of metal plates, such as tunnel liners, caissons and the like.

The object of the present invention is to provide a supplemental means of a simple and novel character that can be readily placed in position when and as desired and will very materially increase the strength and resistance of the plates and structure against abnormal pressures and stresses.

In the accompanying drawings:

Figure 1 is a side elevation of a structure indicating the reenforcement in place and its location with respect to one of the line of plates.

Figure 2 is an end elevation of the same.

Figure 3 is a longitudinal sectional view on the line 3—3 of Figure 1.

Figure 4 is a cross sectional view on the line 4—4 of Figure 1.

Figure 5 is a sectional view on the line 5—5 of Figure 1.

Figure 6 is a longitudinal sectional view of one of the reenforcing girder plates detached.

Figure 7 is a detail view showing the formation of the chords prior to offsetting the ears.

Figure 8 is a plan view of the structure as shown in Figure 7.

Figure 9 is a slight modification of the arrangement of the terminal ears.

Figure 10 is an end elevation of the structure shown in Figure 6.

Figure 11 is a cross sectional view on the line 11—11 of Figure 6.

Figure 12 is a longitudinal sectional view through a slightly modified form of construction.

Figure 13 is a cross sectional view through one of the girder members shown in Figure 12.

Figure 14 is a detail perspective view of one of the wall plates.

Figure 15 is a view in elevation of a modified form of construction.

Figure 16 is a cross sectional view on the line 16—16 of Figure 15.

Figure 17 is a detail sectional view of a portion of the interior of the structure shown in Figure 16.

Figure 18 is a detail sectional view on the line 18—18 of Figure 17.

Figure 19 is a detail view showing the meeting ends of two plates of a row and the associated girder member.

Figure 21 is a cross sectional view taken on the line 21—21 of Figure 20.

Figure 22 is a detail inside view of the connection between the girder members and the plate flanges.

Figure 23 is a detail sectional view on the line 23—23 of Figure 21.

Figure 24 is a perspective view of one of the liner plates of the two modified forms of construction shown in Figures 15 and 20.

Figure 20:
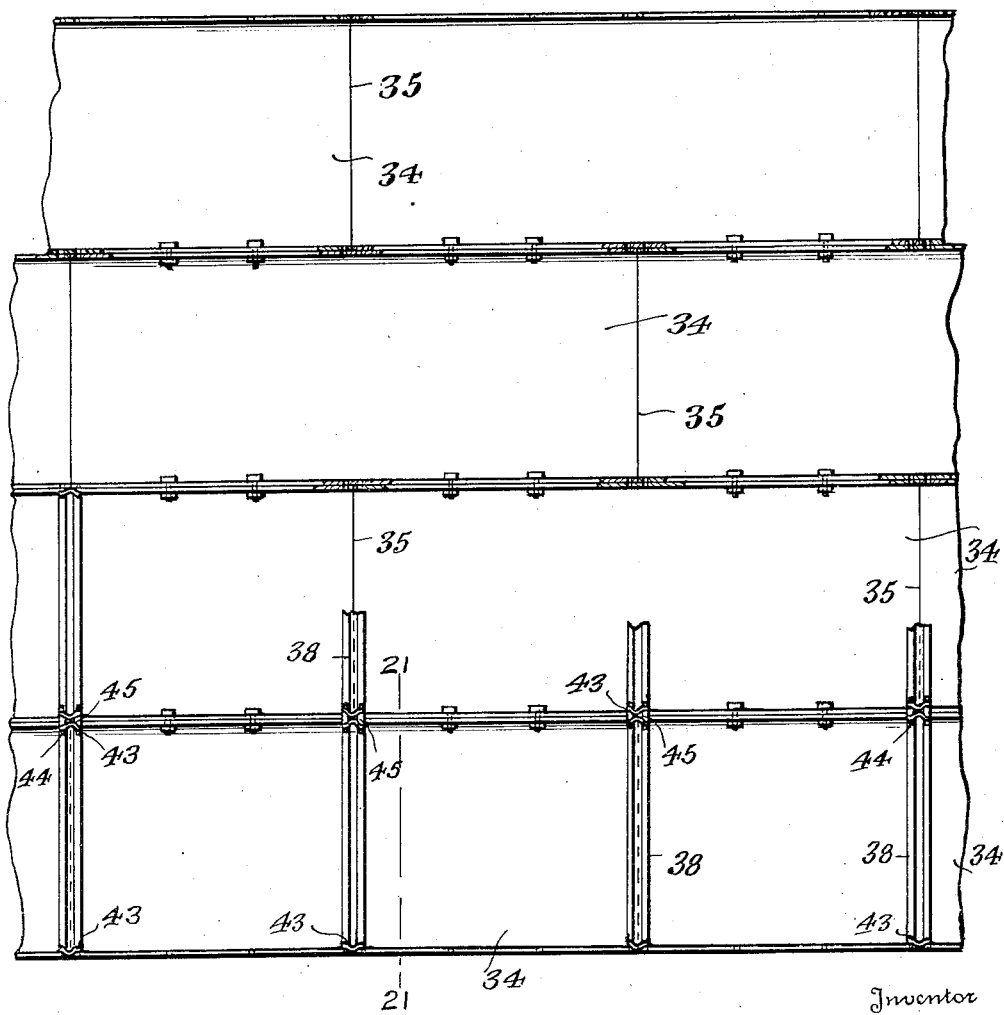
Figure 20 is an internal view of another modified form of construction.

The structure as shown in Figures 1 and 2 is tubular in form and consists of wall plates 15 that may be of the usual formation. That is to say, these wall plates each comprises an outer body wall 16, side flanges 17 and end flanges 18, as will be clear by reference particularly to Figure 14. The side flanges and end flanges have perforations 19, those in the end flanges including centrally disposed openings. These wall plates 15 as usual are assembled in tubular rings end to end so that the end flanges of adjacent plates are abutted and are secured together by tie bolts 20. Likewise adjacent rings are located side by side with the joints of one ring preferably staggered with respect to those of the other, as shown in Figure 1, the side flanges being also secured together by bolts 21 or other fasteners. This type of structure is well known and in common use for a variety of purposes, such as tunnel liners, caissons, etc.

In the structure shown where the pressure is from without, this pressure against the assembly obviously varies according to the character of material surrounding the same and in some places it is greater than in others against the same structure. In order to reenforce the same where necessary or desirable and to provide means that can be readily placed in position either when the structure is built or afterwards, the following is provided.

Any one or more of the rings of plates 15 is reenforced by a girder, which in the present embodiment is made up of individual sections or members, one for each plate 15. As shown in detail in Figures 6 and 11, each of these girder members consists of an inner chord 22 and an outer chord 23, the chords having a curvature corresponding to the curvature of the plate. These chords are connected by a web 24 that is essentially shorter than the chords by having its ends recessed or notched as shown at 25. The projecting ends of the chords are offset as shown at 26 and 27 to provide ears that are perforated as illustrated at 28. The ears 27 are preferably beyond and therefore out of line with the ears 26.

The chord 22 with its ears 26 fits snugly in the chambered portion of the wall plate 15, so that the ears 26 will be alongside the end flanges 18 and the chord 22 will bear against the inner side of the face wall of the plate. The openings 28 of the terminal ears 26 will then be alined with the central openings 19 of the end flanges. The web 24 of the reenforcing member is wider than the plate flanges so that the outer webs 23 will be beyond the same. The tie bolts 20 as shown in Figure 3 are passed through the ears 26 as well as through the abutting end flanges of the plates, and the ears 27 of adjacent girder members being abutted, as shown in Figure 3, fastening bolts 29 secure the same together by being passed through the openings 28 in said ears. The recessed portions 25 of the webs, it will be noted, permit the introduction of the bolts 20 and gives access to them for the purpose of tightening the same.

When assembled it will be clear that a continuous girder or truss reenforcement is provided and where the structure is tubular as shown in Figure 2, this constitutes a complete reenforcing ring that will obviously greatly strengthen not only the individual plates but the structure as a whole.

Instead of a solid web as 24, the same structure may be made with a skeleton reenforcement as illustrated in Figures 12 and 13. As therein disclosed the chords are designated respectively 22a and 23a and the web is shown in the form of a rod 24a of zigzag formation with its knuckles or bends welded to the chords. The chords are provided as in the first mentioned structure with offset ears 26a and 27a. In other respects the structure is the same as that already described and it is obvious that its reenforcing action is the same. This form is particularly desirable not only for lightness in weight, but where the structure is to be lined with concrete as is often the case, the concrete passing through the web and the latter being embedded in the former.

Another modified form of construction is disclosed in Figures 15–19 inclusive. In this form of construction oblong plates are employed that extend lengthwise of the structure and are flanged along their longitudinal lines, or in other words, parallel to the axis of the structure. End flanges are unnecessary. The curvature of the plates is in the short dimension. As shown these plates, which are designated 29, are arranged in longitudinal rows, the joints 30 of the plates of one row being staggered with relation to the joints between the plates of the adjacent row. The girder members 31, formed as already described and as shown in Figure 6, are located in rings around the interior of the structure, being secured together as shown at 32 and also being bolted to the flanges and to each other as illustrated at 33. As will be clear by reference to Figure 15 these rings of girder members are so located that they each underlie certain of the joints 30 and extend across the central portions of the plates between such joints. The same effective support and reenforcement is thus obtained and in addition less material is involved in building up to a required strength as the ends of the plates are not flanged but are nevertheless completely backed and supported by the girder members.

In such a structure the skeleton form of girder member may also be employed as shown in Figures 20–22 inclusive. The plates here designated 34, are of the same form as those shown in Figure 18, one of such plates being illustrated also in Figure 24. They are, as illustrated in Figure 20, located in longitudinal rows with the joints 35 of one row staggered with respect to the joints of adjacent rows. The girder members 36 correspond substantially to the girder members 22a–24a of Figure 12, comprising outer chords 37, inner chords 38 and a lattice bar 39 connecting the chords. The outer chord 37 extends transversely across the inside of the plate and has its offset terminal ears 40 bolted as shown at 41 to the flanges 42 of the plates. The inner chords 38 have offset ears 43 bolted together through their opposite margins, as shown at 44, said margins being spaced apart and having intervening collars 45 through which the bolts pass. This is due to the formation of channels 46 in the chords which provide points of juncture for the knuckles of the lattice bar, which are welded thereto. In this form of structure also and as will be clear by reference to Figure 20 the rings of girder members extend along the joints 35 of the alternate rows of plates.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. In a structure of the character set forth, the combination with wall plates located end to end, of reenforcing girder members located along intermediate portions of the plates between their sides, and common means securing adjacent plates together and securing the girder members to the plates.

2. In a structure of the character set forth, the combination with wall plates having end flanges, of reenforcing girder members that engage the intermediate portions of the wall plates between the flanges thereof, and common fasteners securing the adjacent flanges of adjacent plates together and securing the girders in place.

3. In a structure of the character set forth, the combination with wall plates having end flanges, of reenforcing girder members that extend along the wall plates and have offset ears that lie alongside, the flanges, and means securing the ears and flanges together.

4. In a structure of the character set forth, the combination with a line of assembled wall plates of chambered formation, of a reinforcing girder extending continuously along the line of wall plates and having portions entering the chambered portions thereof and bearing against the body walls of the plates.

5. In a structure of the character set forth, the combination with a line of assembled wall plates of chambered formation, of a reenforcing girder extending along the line of wall plates and comprising members entering the chambered portions thereof and bearing against the walls of the plates, and means directly securing the girder members together.

6. In a structure of the character set forth, the combination with a line of wall plates having associated end flanges, of a girder comprising members that engage the plates between the flanges, and means securing the members together beyond the flanges of the wall plates.

7. In a structure of the character set forth, the combination with a line of wall plates having associated end flanges, of a girder comprising members that engage the plates between the flanges, and means securing the members together through the flanges and also beyond the same.

8. In a structure of the character set forth, the combination with a line of wall plates having associated end flanges, of a girder comprising members that engage the plates between the flanges, said members having terminal inner and outer ears, the inner ears being located alongside the flanges, the outer gears being beyond the same, fasteners passing through the flanges and the inner ears, and means securing together the outer ears.

9. In a structure of the character set forth, the combination with a line of wall plates having associated end flanges, of a girder comprising members that engage the plates between the flanges, said members each comprising inner and outer chords and a web between the chords that causes the outer chord to extend beyond the flanges, said chords having terminal ears, fasteners passing through the flanges and securing the ears of the inner chords together, and means securing together the ears of the outer chords.

10. In a structure of the character set forth, the combination with a line of wall plates having associated end flanges, of a girder comprising members that engage the plates between the flanges, said members each comprising inner and outer chords and a web between the chords that causes the outer chord to extend beyond the flanges, said web being of less length than the chords and the projecting ends of the chords being offset to form ears, fasteners passing through the flanges and securing the ears of the inner chords together, and means securing together the ears of the outer chords.

11. In a structure of the character set forth, the combination with rows of wall plates, the joints between the plates of one row being staggered with relation to the joints of an adjacent row, and a continuous reenforcing girder extending across the rows of plates in line with the joints of certain of the rows and between the joints of other rows.

12. In a structure of the character set forth, the combination with rows of wall plates having flanges along the meeting edges of the rows, the joints between the plates of one row being staggered with relation to the joints of an adjacent row, and a continuous reenforcing girder extending across the rows of plates in line with the joints of certain of the rows and between the joints of other rows and being secured to the flanges of the plates.

13. In a structure of the character set forth, the combination with rows of wall plates having flanges along the meeting edges of the rows and the meeting edges of the plates in a row being unflanged, the joints between the plates of one row being staggered with relation to the joints of an adjacent row, and a continuous reenforcing girder extending transversely of the flanges and secured thereto, said girder extending along the joints formed by the unflanged meeting ends of certain of the rows and between the joints of other rows.

14. A reenforcement for tunnel wall plates and the like of the usual formation comprising a girder section of a length and shape to lie against the inner side of a wall plate and of a depth greater than the depth of the inner side of the wall plate so as to project beyond said inner side, said girder having at the ends of its projecting portion, means for securing said ends to the corresponding end portions of other reenforcements.

15. A reenforcement for curved tunnel wall plates and the like of the usual formation comprising a girder section of a length and curvature to lie against the inner side of a wall plate and of a depth greater than the depth of the inner side of the wall plate so as to project beyond said inner side, said girder having at the ends of its projecting portion, ears to receive fastening means for securing said ears to the corresponding ears of adjacent reenforcements.

16. A curved lining structure including a row of plates located and secured together end to end, and a corresponding row of reenforcing girder members located end to end on and against the inner sides of the plates and having portions wider than the thickness of the plates and secured directly together on the inner sides of the plates and independently thereof.

17. A curved lining structure including a row of flanged plates located end to end and having their flanges secured together, and a corresponding row of reenforcing girder members located end to end on and against the inner sides of the plates and wider than the width of the flanges so as to project beyond the inner edges thereof, said projecting portions of the girder members being secured directly together at the inner sides of the plates.

18. A reenforcing girder member for flanged wall plates of the usual formation, said member comprising an inner bearing chord of a length to fit between opposite flanges of the plate and bear against the plate between said flanges, an outer chord, and a web connecting the chords and having a depth greater than the depth of the plate flanges whereby said outer chord will be outside the flanges of the wall plate.

19. A reenforcing girder member for flanged wall plates of the usual formation, said member comprising an inner bearing chord of a length to bear against the plate between opposite flanges thereof, an outer chord of greater length than the axial distance between said flanges, a web between the chords and of less length than the same, and offset fastening ears on the projecting ends of the chords.

WALTER F. SCHULZ.